April 2, 1968  B. C. DAVIS ETAL  3,376,169
THERMOCOUPLE ASSEMBLY HAVING A DEFORMABLE FERRULE HOUSING
Filed July 12, 1963
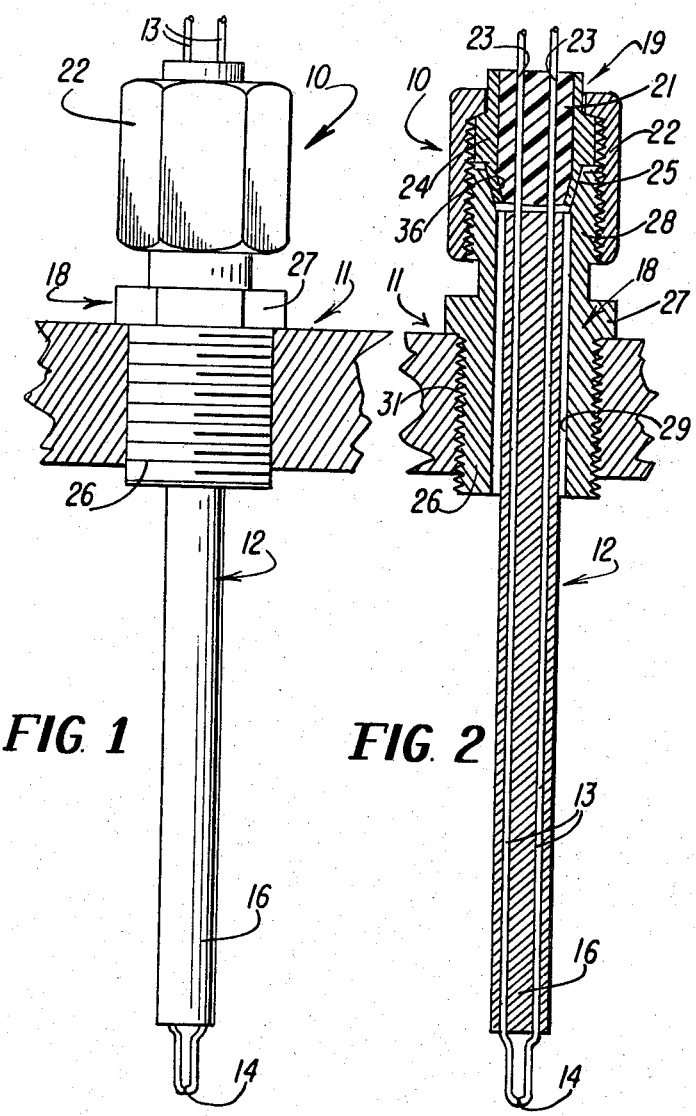
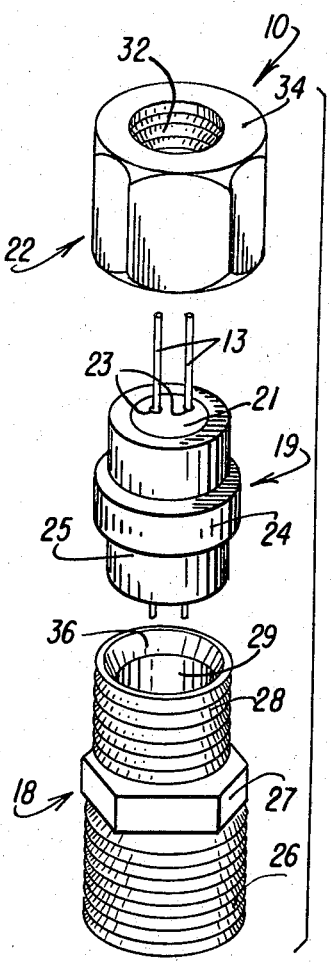
INVENTORS
Bayard C. Davis
Alvin Singer
Byron, Hume, Groen & Clementi
Attys.

United States Patent Office 3,376,169
Patented Apr. 2, 1968

3,376,169
THERMOCOUPLE ASSEMBLY HAVING A DEFORMABLE FERRULE HOUSING
Bayard C. Davis, Elmhurst, Ill. (272 Illinois St., Glenview, Ill. 60025), and Alvin Singer, 4646 Laurel Ave., Glenview, Ill. 60025
Filed July 12, 1963, Ser. No. 294,611
3 Claims. (Cl. 136—230)

ABSTRACT OF THE DISCLOSURE

A holder for supporting a pair of thermocouple wires comprises three basic elements, namely, a deformable ferrule, a main body portion with a tapered receiving aperture for the ferrule and a threaded exterior wall portion, and a securing nut which is threaded onto the main body portion with the ferrule situated therebetween. The ferrule comprises a sleeve member having an external flang and an insert plug situated within the sleeve and having apertures for passing the thermocouple wires. Tightening of the securing nut deforms the ferrule to effect a sealing between respectively the ferrule sleeve and the tapered receiving aperture and the insert plug and thermocouple wires.

---

This invention relates to thermocouple holders and more particularly to an improved holder for a thermocouple assembly.

It is an object of the invention to provide an improved holder for a thermocouple assembly.

It is a further object of the invention to provide a thermocouple holder which includes a minimum number of parts and which is readily assembled and disassembled.

Still another object of the invention is to provide a thermocouple holder that is readily secured to an enclosure that surrounds a region at the temperature of interest and is substantially unaffected by either high pressure or high temperature conditions.

An additional object of the invention is to provide a holder that positively confines a thermocouple assembly and precludes the assembly from being damaged by undesired movement relative to the holder.

Other objects and advantages of the present invention will become apparent from the following detailed description when considered in conjunction with the accompanying drawing, wherein:

FIGURE 1 is an enlarged side elevation of a thermocouple holder embodying the features of the present invention;

FIGURE 2 is a cross-sectional view generally similar to FIGURE 1 which illustrates the manner in which a thermocouple assembly is maintained within the holder; and FIGURE 3 is an exploded view illustrating the features of the holder depicted in FIGURES 1 and 2 in greater detail.

In general, a thermocouple holder embodying the features of the present invention includes a deformable supporting member that is formed of a suitable insulating material. The deformable supporting member is provided with at least a pair of spaced-apart apertures that extend through the supporting member and serve to maintain segments of the wires that form the major portion of a thermocouple assembly. An enclosure is provided about the deformable supporting member. Preferably, the enclosure has apertured end portions, through which the thermocouple wires extend and a suitably proportioned outer supporting surface. The holder also includes a main body element formed by a pair of mating members that are designed to be joined about the enclosure.

When the mating members are joined about a thermocouple assembly, forces are exerted on the enclosure that effect the deformation thereof and preclude the enclosure from moving relative to the main body portion. In addition, these forces are transmitted to the supporting member confined within the enclosure so that this member is also partially deformed, and the thermocouple wires maintained therein are thereby sealed and positively held in place.

Referring specifically to FIGURES 1 and 2, a thermocouple holder embodying the features of the present invention and generally designated by the numeral 10 is shown mounted in engagement with an apertured wall portion 11. The wall portion 11 may, for example, form a part of a housing or conduit member that confines and/or communicates with an environment, the temperature of which is to be measured and recorded by a thermocouple assembly suported in the holder 10.

In the illustrated embodiment of the invention, the holder 10 confines and supports a thermocouple assembly 12 including a pair of dissimilar thermocouple wires 13 that are joined to form a thermocouple junction 14. The thermocouple assembly 12 is formed so that aligned portions of each of the dissimilar wires 13 are confined in spaced relation within a suitable tubular insulator 16 adjacent the exposed thermocouple junction.

The holder 10 which accommodates the thermocouple assembly 12 preferably includes three principal elements that can be readily assembled and disassembled. These elements are a main body element 18, a compressive enclosure or ferrule 19 that houses a suitable wire-confining insert 21, and a securing or capping nut 22 that is designed to mate with main body element 18.

Considering in detail the thermocouple mounting structure provided by the holder 10, the wire-confining insert 21, which is fixedly maintained within the compressive ferrule 19 is preferably formed of a deformable temperature and/or moisture resistant material. In this connection, the insert 21 may, for example, be formed of a tetrafluoroethylene polymer (Teflon), neoprene synthetic rubber, lava or the like, the choice of the material being dictated by the environmental conditions (e.g. pressure and temperature) to which the holder and thermocouple assembly are to be exposed.

As shown in FIGURES 2 and 3, the insert 21, which is introduced to the enclosing compressive ferrule 19 in a manner consistent with the characteristics of the material forming the insert for a particular application, has a pair of spaced-apart wire receiving apertures 23 provided therein that extend along the length of the insert. The apertures 23 receive and maintain segments of the thermocouple wires 13 just above the upper extremity of the tubular ceramic insulator 16.

A supporting flange 24 is provided about the central portion of the compressive ferrule 19. The end portions 25 of the ferrule, which extend from the flange, have a generally cylindrical configuration. These portions of the ferrule are designed to deform and mate with the inner supporting surface of the main body element 18, as hereinafter described.

In the illustrated embodiment, the main body element 18 has a threaded lower end portion 26, a multifaced or hexagonally shaped central portion 27, and a threaded upper end portion 28.

In a conventional manner, the threaded lower end portion 26 of the element 18 is designed to be threadably positioned within a suitably threaded aperture 31 provided in the wall portion 11 as shown in FIGURE 2. To accommodate this positioning, the hexagonally shaped central portion 27 is adapted to be engaged by a wrench or the like. When the threaded lower end portion 26 is untapered, the central portion 27 acts as a stop that abuts the wall portion after the element 18 is fully positioned within the aperture 31. The threaded upper end portion 28 of the element 18 is proportioned to receive the capping nut 22 which is also preferably shaped to receive a wrench or the like.

As depicted in FIGURE 2, the capping nut 22 has an inner threaded surface 32 that complements the threaded end portion 28 and an apertured cover plate 34 through which a portion of the thermocouple assembly extends, as hereinafter described.

A generally cylindrical aperture 29 extends along the length of and through the main body element 18. This aperture 29 communicates with a frustoconically-shaped opening or support surface 36 defined by a portion of the inner wall of the upper threaded end portion 28. The generally cylindrical aperture 29 preferably has a diameter that is somewhat larger than the outer diameter of the ceramic insulator 16 provided for the thermocouple 12, and the opening 36 is suitably proportioned to receive the ferrule 19.

Although the holder 10 as described above includes only three principal coacting elements, a thermocouple assembly, when suitably mounted within the holder, is positively precluded from rotation. In this connection, the mounting of the thermocouple assembly 12 within the holder 10 is initiated by passing the free ends of the wires 13 through the apertures 23 provided in the insert 21. When the wires are properly positioned so that the junction 14 formed by the wires 13 is spaced the desired distance from the ferrule 19, this partial assembly is ready to be positioned within the main body element 18.

Thereafter, the portion of the thermocouple assembly 12 beneath the ferrule 19 (i.e. the wire confining ceramic insulator 16 and the junction 14) is passed through the aperture 29 and the compressive ferrule is brought to rest on the inner unthreaded surfaces of the end portion 28. The capping nut 22 is then passed over the free ends of the wires 13 and is threadably secured to the end portion 28. As a result, the downwardly extending end portion 25 is advanced into engagement within the surface 36, and becomes deformed so that it complements the configuration of this surface.

Preferably, the inside diameter of the aperture provided in the cover plate 34 of the capping nut 22, is somewhat larger than the outside diameter of that portion of the ferrule 19 which extends above the flange 24. Accordingly, as the cap is initially threaded onto the upper end portion of the main body element 18, neither the ferrule 19 nor the wires 13 are engaged thereby. Continued threading of the cap 22 brings the aperture defining portion of the cover plate 34 into engagement with the flange 24. However, although the ferrule is contacted by the cap 22, this member is precluded from rotation since the cap concomitantly applies a downward force to the flange. Consequently, the lower tapered end portion 25 of the ferrule is driven into engagement with the support surface 36, that is, the ferrule becomes bound in place between the descending cap 22 and the coacting surfaces of the ferrule and of the main body element.

Further threading of the cap into full engagement with the main body element 18 results in diverse compressive forces being transmitted to the ferrule and to the insert 21 confined therein. As a consequence, the end portion 25 and the insert 21 are partially deformed and the wires 13 are sealed and positively gripped to the extent that the subsequent connection of the free ends of the wires to suitable measuring instrumentalities or the like does not reuslt in the desired position of the junction 14 being varied.

From the foregoing, it should be apparent that the present invention provides an improved holder for a thermocouple assembly. Although the holder 10 is constructed with a minimum number of parts so as to be readily assembled and disassembled, the possibility of damage to a thermocouple assembly confined therein is minimized.

It should be further understood that the foregoing is merely illustrative of the invention. Various modifications of the holder structure can be devised by those skilled in the art without departing from the invention as set forth in the accompanying claims.

What is claimed is:

1. A thermocouple assembly which comprises:
   a pair of wires joined to form a thermocouple junction;
   deformable ferrule means comprising an open-ended sleeve member composed of a soft metal and having an external flange integral with said sleeve and extending about the entire periphery thereof and an insert plug formed of an electrically insulative deformable material disposed within said sleeve member and having a pair of spaced apertures, said apertures just accepting individual ones of said wires and extending between the open ends of said sleeve member;
   a main body portion having interior wall portions defining a tapered receiving aperture for said ferrule means and having a threaded external wall portion;
   a securing nut having a cap portion for engaging said flange and adapted to threadably engage said threads of said main body portion for fixedly confining said deformable ferrule means between said securing nut and said tapered receiving aperture in a partially deformed state to effect seals between respectively said plug and said thermocouple wires and said sleeve member and said tapered receiving channel and further to effect a positive gripping of said thermocouple wires by said insert plug so that said wires and said junction formed thereby are maintained in fixed relation relative to said main body portion.

2. The combination according to claim 1 in which the portions of said sleeve extending above and below said flange are substantially identical and further in which the frictional forces between said cap and said flange are small relative to those between said sleeve member and said walls of said receiving aperture to prevent rotation of said ferrule means relative to said body portion on tightening of said securing nut.

3. The combination according to claim 2 in which said insert plug is formed of a moisture and temperature resistant material and in which said insert plug has a line-to-line fit with said sleeve member and is fixedly supported therein.

References Cited

UNITED STATES PATENTS

| | | | |
|---|---|---|---|
| 1,345,473 | 7/1920 | Benjamin | 1/4—77 X |
| 1,426,337 | 8/1922 | Sperry | 174—77 X |
| 1,469,034 | 9/1923 | Benjamin | 174—77 |
| 1,690,994 | 11/1928 | Powell | 174—77 |
| 2,625,573 | 1/1953 | Connell | 136—230 |
| 2,707,198 | 4/1955 | Jones | 136—235 |
| 2,718,543 | 9/1955 | Lidderdale | 174—77 |
| 2,806,075 | 9/1957 | Gaubatz | 136—231 |
| 2,898,933 | 8/1959 | Bancraft | 136—235 X |

FOREIGN PATENTS

| | | |
|---|---|---|
| 814,503 | 6/1959 | Great Britain. |

ALLEN B. CURTIS, *Primary Examiner.*

WINSTON A. DOUGLAS, *Examiner.*

A. M. BEKELMAN, *Assistant Examiner.*